UNITED STATES PATENT OFFICE.

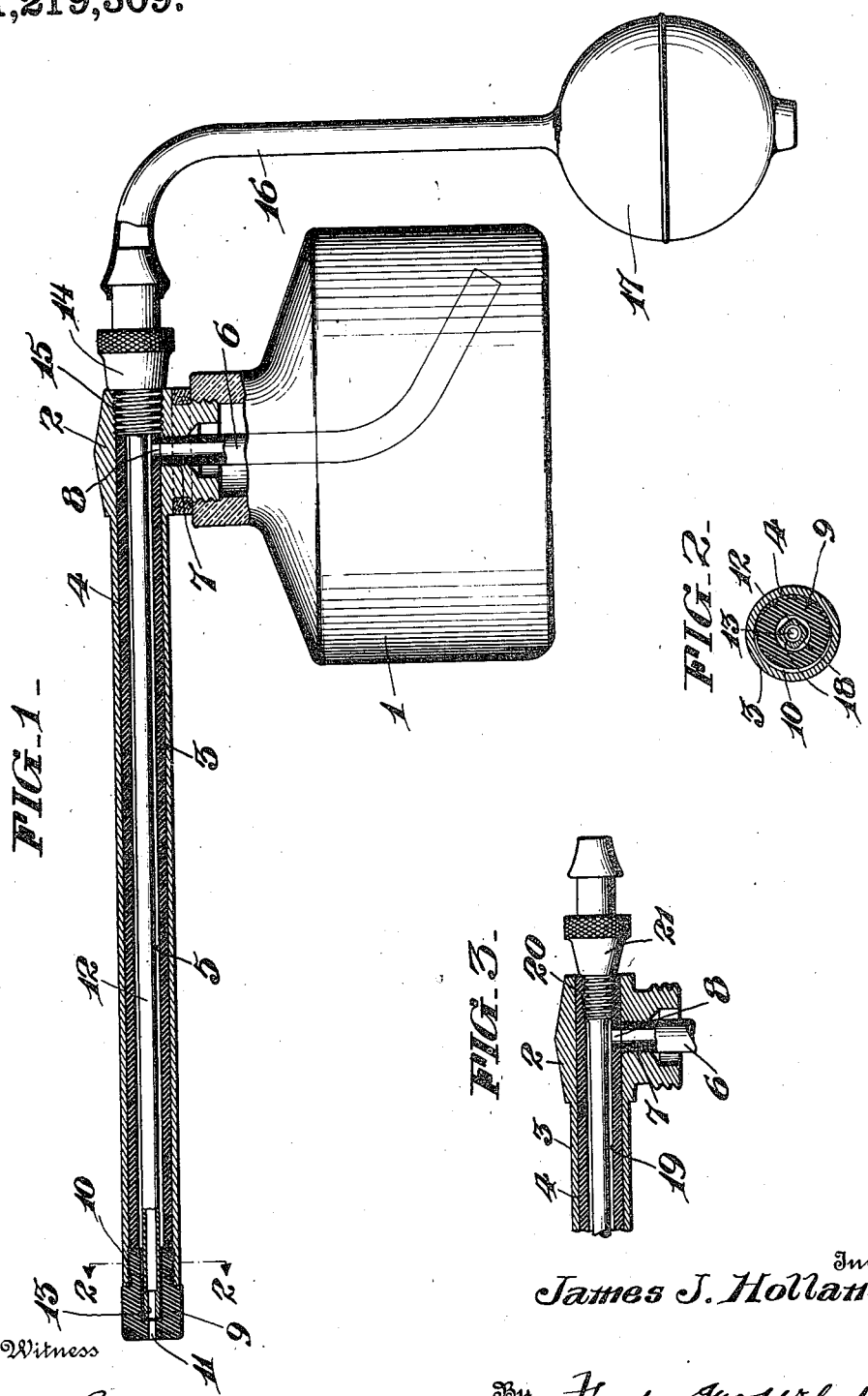

JAMES J. HOLLAND, OF PHILADELPHIA, PENNSYLVANIA.

ATOMIZER.

1,219,309.

Specification of Letters Patent. Patented Mar. 13, 1917.

Application filed June 29, 1916. Serial No. 106,544.

*To all whom it may concern:*

Be it known that I, JAMES J. HOLLAND, a citizen of the United States, residing at Philadelphia, in the county of Philadelphia and State of Pennsylvania, have invented certain new and useful Improvements in Atomizers, of which the following is a specification.

My invention relates to improvements in atomizers, the object of the invention being to provide an atomizer, nebulizer, or other spraying device designed for medicinal uses, which is so lined, constructed, and arranged, as to permit the use of bichlorids, iodin, and other similar medicines or chemicals which attack and corrode ordinary metals.

A further object is to provide an atomizer which can be readily kept in a clean and sanitary condition, which is comparatively simple in construction, and which most efficiently performs the functions for which it is intended.

With these and other objects in view the invention consists in certain novel features of construction and combinations and arrangements of parts as will be more fully hereinafter described and pointed out in the claims.

In the accompanying drawings:

Figure 1 is a view in longitudinal section, partly in elevation, illustrating my improvements.

Fig. 2 is a view in transverse section, on the line 2—2 of Fig. 1, and

Fig. 3 is a fragmentary view in longitudinal section illustrating a modification.

1 represents a bottle, or receptacle, into which the head 2 of my improved atomizer is secured in any approved manner.

The head 2 is provided with an integral or fixed tube 3 of the desired length and diameter, which registers with the longitudinal bore 4 of head 2.

Inside of tube 3, and extending into the longitudinal bore 4, is a lining tube 5 cemented, vulcanized, or in any approved manner secured inside the tube 3 and head 2 and comprises the liquid discharge tube. This lining tube 5 is preferably of hard rubber or other non-corrodible material.

I would have it understood that in the use of this expression "non-corrodible," I employ the same to include such materials as will permit the use of bichlorids, iodin, or other chemicals which are used as sprays for medicinal or other purposes, and which attack and corrode ordinary metals.

A liquid supply tube 6, of hard rubber or other non-corrodible material, projects into the receptacle 1, and at its upper discharge end is secured, preferably by screw threads, in the central opening 7 of the head 2. The tube 6 at its extreme upper end bears tightly and snugly against the lining tube 5 and communicates with an opening 8 in the tube 5 so as to direct the liquid into the interior of the lining tube 5.

A nozzle 9, of hard rubber or other non-corrodible material, is screwed into the internally threaded outer end of tube 3 as shown at 10, and bears against the end of lining tube 5. The nozzle 9 is made with a restricted discharged orifice 11, which is in alinement with the discharge end of air tube 12.

The air tube 12 is of appreciably less external diameter than the internal diameter of lining tube 5, and extends throughout the length of the lining tube, and at its discharge end, projects into the nozzle 9 and has its internal bore decreased at its extreme end by an internal annular enlargement 13, as shown clearly in Fig. 1.

This internal enlargement is of such internal dimension as to bring the internal diameter of the air tube to substantially the same diameter as the orifice 11 in nozzle 9, thereby increasing the pressure and velocity of the air as it escapes through the orifice 11 to produce the best result in atomizing or nebulizing the liquid.

The inlet end of air tube 12 is fixed or integral with a screw threaded nipple 14 which screws into the threaded end 15 of head 2 and bears against the end of lining tube 5.

A flexible hose 16 is connected to the nipple 14 and provided with a bulb 17 or other device for forcing air through the tube. The tube 12 is composed of silver or other non-corrodible material which is adapted to stand the action of the chemicals above referred to, and at its discharge end is provided with external, flattened surfaces 18, which permits the free flow of liquid around the outside of air tube 12 to the orifice 11.

In the modification shown in Fig. 3, the lining tube 19 corresponding to the lining tube 5 of the preferred form, extends through the length of head 2, and is provided with internal screw threads 20 to receive the threads of the nipple 21.

By constructing my improved atomizer as above described, the liquid comes in contact only with material which can withstand its chemical action, and be not injured thereby or effect the liquid in an injurious manner. By reason of this construction my improved atomizer is practically as strong as if made entirely of metal.

Various slight changes may be made in the general form and construction of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. An atomizer comprising a head having a tube projected therefrom, a lining tube in the first mentioned tube and head, a liquid supply tube secured in the head and communicating with the interior of the lining tube, an air tube projecting into the lining tube across the end of the liquid supply tube, and said lining tube, liquid supply tube, and air tube composed of non-corrodible material.

2. An atomizer comprising a head having a tube projected therefrom, a lining tube in the first mentioned tube and head, a nozzle in the end of the first mentioned tube and located against the end of the lining tube, a liquid supply tube secured in the head and bearing against the lining tube, said lining tube having an opening therein communicating with the liquid supply tube, an air tube projecting through the lining tube into the nozzle, and said lining tube, nozzle, liquid supply tube, and air tube, composed of non-corrodible material.

3. An atomizer comprising a head having a longitudinal bore and having an opening in its central bottom portion connected with the bore, a tube fixed to the head and having its bore registering with the bore of the head, a lining tube secured in the first mentioned tube and bore of the head and having an opening in its wall, a liquid supply tube secured in the opening in the head, bearing against the lining tube and communicating with the opening in the wall of the latter, an air tube extending through the lining tube and removably secured in the head, said lining tube, liquid supply tube, and air tube, composed of non-corrodible material.

4. An atomizer comprising a head having a longitudinal bore and having an opening in its central bottom portion communicating with the bore, a tube fixed to the head and having its bore registering with the bore of the head, a lining tube secured in the first mentioned tube and bore of the head and having an opening in its wall, a liquid supply tube secured in the opening in the head, bearing against the lining tube and communicating with the opening in the wall of the latter, an air tube extending through the lining tube and removably secured in the head, a nozzle secured in the end of the first mentioned tube, bearing against the lining tube, and receiving the discharge end of the air tube, said lining tube, nozzle, liquid supply tube, and air tube composed of non-corrodible material.

5. An atomizer comprising a head having a longitudinal bore, and having an integral tube projecting from the head with its bore registering with the bore of the head, of a lining tube secured in the first mentioned tube and in a portion of the bore of the head, said head and lining tube having openings therein, a liquid supply tube secured in the head bearing against the lining tube and registering with the opening in the latter, an air tube projecting through the lining tube and having a screw threaded nipple thereon screwed into the head and bearing against the end of the lining tube, said lining tube, liquid supply tube, and air tube composed of non-corrodible material.

6. An atomizer comprising a head having an integral tube projecting from the head and said head having a longitudinal bore registering with the bore of the tube, of a lining tube secured in the first mentioned tube and in a portion of the bore of the head, said head and lining tube having openings therein, a liquid supply tube secured in the head bearing against the lining tube and registering with the opening in the latter, an air tube projecting through the lining tube and having a screw threaded nipple thereon screwed into the head and bearing against the end of the lining tube, a nozzle screwed into the end of the first mentioned tube and bearing against the end of the lining tube, said nozzle and air tube having restricted orifices in their ends, and said nozzle, lining tube, liquid supply tube, and air tube composed of non-corrodible material.

In testimony whereof I have signed my name to this application in the presence of two subscribing witnesses.

JAMES J. HOLLAND.

Witnesses:
EDWARD H. BUCKLEY,
GEO. H. KILLIAN.